US007928895B2

(12) United States Patent
Bunch et al.

(10) Patent No.: US 7,928,895 B2
(45) Date of Patent: Apr. 19, 2011

(54) SYSTEMS AND METHODS FOR COMMUNICATION TO A GIMBAL MOUNTED DEVICE

(75) Inventors: Brian P. Bunch, Snohomish, WA (US); Steve Mowry, Duvall, WA (US); Paul Ferguson, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 114 days.

(21) Appl. No.: 12/247,799

(22) Filed: Oct. 8, 2008

(65) Prior Publication Data

US 2010/0085254 A1 Apr. 8, 2010

(51) Int. Cl.
*G01S 13/00* (2006.01)
(52) U.S. Cl. .......................... 342/60; 340/5.61; 340/5.64
(58) Field of Classification Search ................... 342/103
See application file for complete search history.

(56) References Cited

U.S. PATENT DOCUMENTS 5,838,278 A 11/1998 Tsujisawa et al.
6,262,687 B1 * 7/2001 Bai et al. ........................ 343/757
7,183,966 B1 2/2007 Schramek et al.
2002/0083573 A1 7/2002 Matz et al.
2002/0084948 A1 7/2002 Watson
2002/0184640 A1 * 12/2002 Schnee et al. ................. 725/105
2005/0164636 A1 * 7/2005 Palermo et al. .............. 455/41.2
2007/0075182 A1 4/2007 Fetterly
2007/0075237 A1 4/2007 Mills et al.
2007/0194170 A1 * 8/2007 Ellison et al. .................. 244/3.1
2007/0217736 A1 9/2007 Zhang et al.
2008/0084357 A1 4/2008 Smeltzer

FOREIGN PATENT DOCUMENTS

GB 1051913 12/1996
GB 2310975 A 10/1997
WO 0205383 A1 1/2002
WO 2006065892 A2 6/2006
WO 2008141297 A1 11/2008

* cited by examiner

*Primary Examiner* — Thomas H Tarcza
*Assistant Examiner* — Timothy A Brainard
(74) *Attorney, Agent, or Firm* — Black Lowe & Graham PLLC

(57) ABSTRACT

A system and method wirelessly communicates signals between a device on a gimbal and a stationary transceiver. An exemplary system has a gimbal with a moveable portion, a device affixed to the moveable portion, a gimbal transceiver coupled to the moveable portion, and a stationary transceiver, wherein the gimbal transceiver and the stationary transceiver are configured to communicate with each other using a wireless signal.

9 Claims, 2 Drawing Sheets

SYSTEMS AND METHODS FOR COMMUNICATION TO A GIMBAL MOUNTED DEVICE

BACKGROUND OF THE INVENTION

Various devices may be mounted on a single axis, a two-axis, or a three-axis gimbal to facilitate orientation of the device towards a desired direction. FIG. 1 illustrates a prior art radar antenna 102 and a two-axis gimbal system 104. When the radar antenna 102 is affixed to the gimbal system 104, the radar antenna 102 may be pointed in a desired horizontal and/or vertical direction. When the gimbal system 104 includes motors, the radar antenna 102 may be oriented on a real time basis.

For example, when the radar antenna 102 is used in a vehicle, such as an aircraft or a ship, the radar antenna 102 may be continuously swept in a back-and-forth manner along the horizon, thereby generating a view of potential hazards on a radar display. As another example, the radar antenna 102 may be moved so as to detect a strongest return signal, wherein a plurality of rotary encoders or other sensors on the gimbal system 104 provide positional information for determining the direction that the radar antenna 102 is pointed. Thus, based upon a determined orientation of the radar antenna 102, and also based upon a determined range of a source of a detected return signal of interest, a directional radar system is able to identify a location of the source.

The two-axis gimbal system 104 includes a support member 106 with one or more support arms 108 extending therefrom. A first rotational member 110 is rotatably coupled to the support arms 108 to provide for rotation of the radar antenna 102 about the illustrated Z-axis. The first rotational member 110 is rotatably coupled to a second rotational member 112 to provide for rotation of the radar antenna 102 about the illustrated Y-axis, which is perpendicular to the Z-axis.

A moveable portion 114 of the gimbal system 104 may be moved in a desired manner. One or more connection members 116, coupled to the moveable portion 114, secure the radar antenna 102 to the gimbal system 104. Motors (not shown) operate the rotational members 110, 112 to orient the radar antenna 102 in a desired direction.

The gimbal system 104 is affixed to a base 118. The base 118 may optionally house various electronic components therein (not shown), such as components of a radar system. Electronic components coupled to the radar antenna 102, such as the signal processor 120, are communicatively coupled to the radar system (or to other remote devices) via a wire connection 122. The signal processor 120 processes detected radar returns into a signal that is then communicated to a radar system. The connection 122 may be a conductor that communicates an information signal from the signal processor 120 corresponding to radar signal returns detected by the radar antenna 102.

As illustrated in FIG. 1, the connection 122 is physically coupled to the base 118. The connection 122 may be a cable, conductor, or the like, that flexes as the signal processor 120 and the antenna 102 are moved by the gimbal system 104. In some applications, a plurality of connections 122 may exist. For example, a second connection 124 may be a conductor that provides information to the signal processor 120.

Over long periods of time, the connections 122 and/or 124, and/or their respective points of attachment 126, may wear and potentially fail due to the repeated flexing as the radar antenna 102 is moved by the gimbal system 104. Failure of the connections 122 and/or 124 may result in a hazardous operating condition, such as when the radar antenna 102 and the gimbal system 104 are deployed in an aircraft. Failure of the connections 122 and/or 124 would cause a failure of the aircraft's radar system. Accordingly, it is desirable to prevent failure of the connections 122 and/or 124 so as to ensure secure and reliable operation of the radar antenna 102.

SUMMARY OF THE INVENTION

Systems and methods of wirelessly communicating signals between a device on a gimbal and a stationary transceiver are disclosed. An exemplary embodiment has a gimbal system with a moveable portion, a device affixed to the moveable portion, a gimbal transceiver coupled to the moveable portion, and a stationary transceiver. The gimbal transceiver and the stationary transceiver are configured to communicate with each other using a wireless signal.

In accordance with further aspects, an exemplary gimbal communication system orients a device affixed to a moveable portion of a gimbal towards a desired direction, receives information from the device, communicates a wireless signal from a gimbal transceiver physically coupled to the device, and receives the wireless signal at a stationary transceiver. The received information is encoded in the wireless signal.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
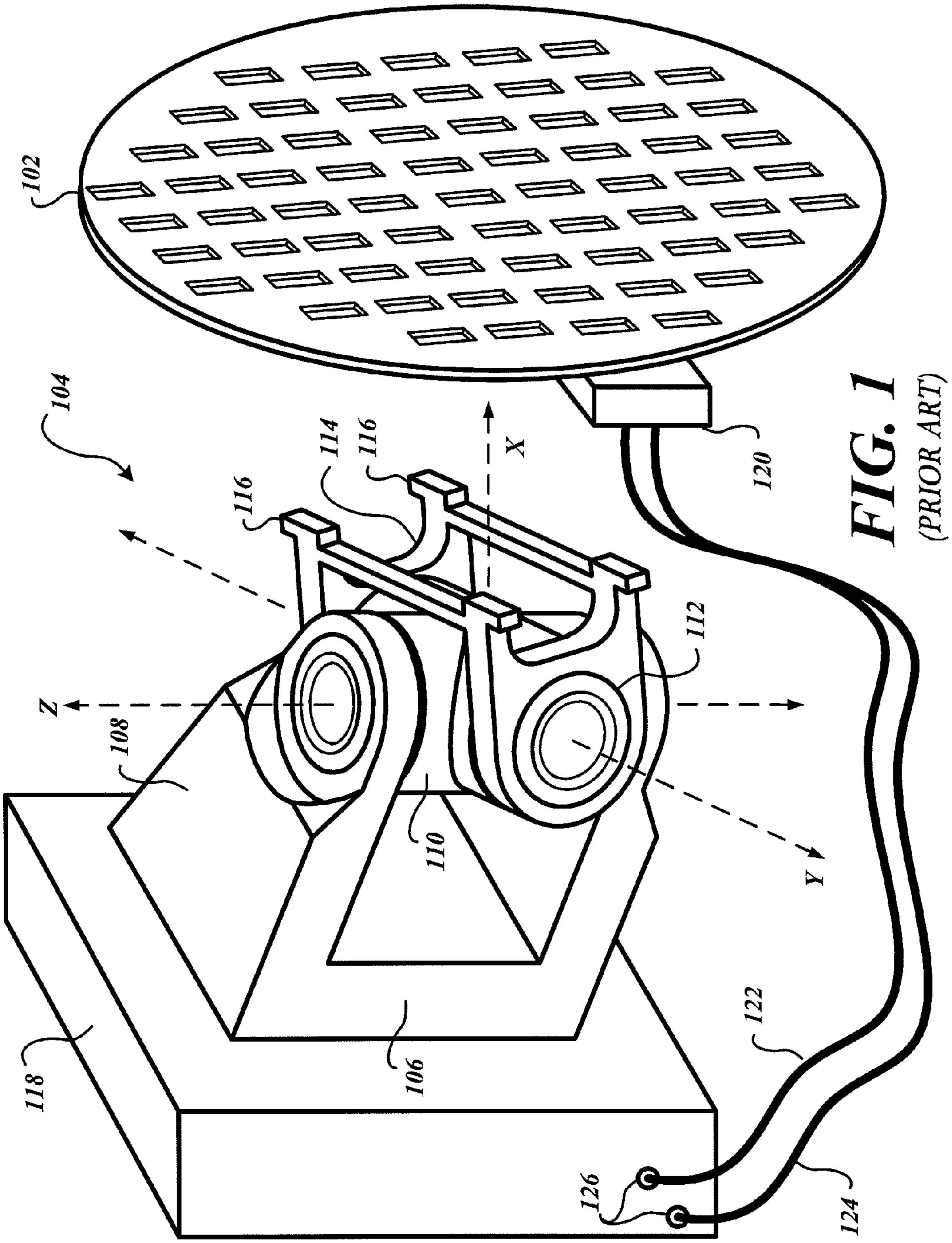
FIG. 1 (PRIOR ART)
FIG. 1 illustrates a prior art radar antenna and a two-axis gimbal system.
Figure 2:
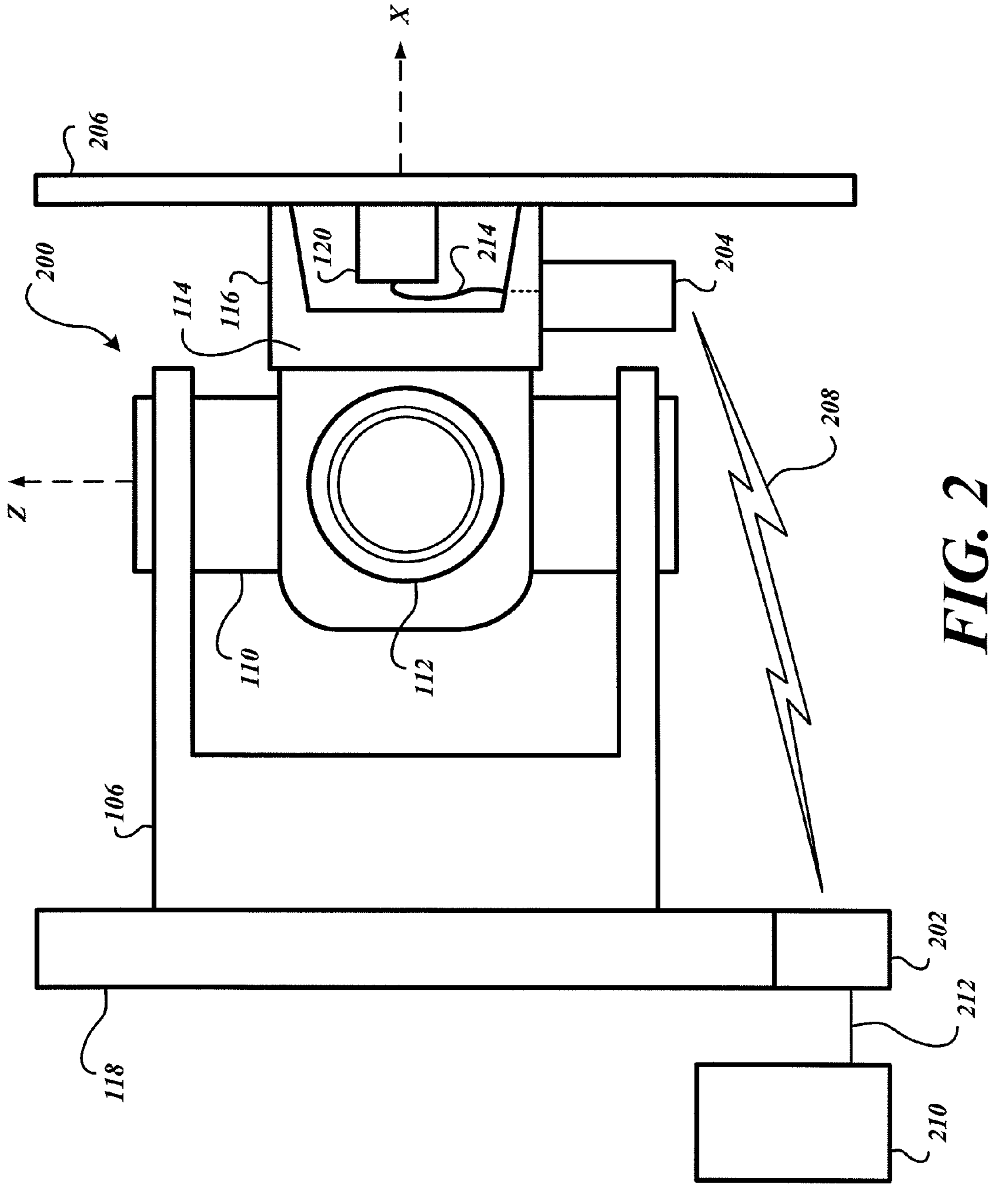
FIG. 2 is a block diagram of an embodiment of a wireless information transfer gimbal system.

FIG. 2 is a block diagram of an embodiment of a wireless information transfer gimbal system 200. The exemplary wireless information transfer gimbal system 200 is illustrated as a two-axis gimbal. The wireless information transfer gimbal system 200 may be a single axis gimbal system, a three-axis gimbal system, or a gimbal system with more than three axis, in alternative embodiments.

Embodiments of the wireless information transfer gimbal system 200 include a stationary transceiver 202, a gimbal transceiver 204, and a device, such as an antenna 206. The transceivers 202, 204 are operable to communicate with each other using a wireless signal 208.

The stationary transceiver 202 is affixed, in this exemplary embodiment, to the base 118 at a convenient location. In other embodiments, the stationary transceiver 202 may be affixed to another structure, and/or at another location, where the stationary transceiver 202 is operable to receive, and/or transmit, the wireless signal 208.

The gimbal transceiver 204 is affixed to the moveable portion 114. In alternative embodiments, the gimbal transceiver may be coupled to one or more of the connection members 116, to the antenna 206, to the second rotational member 112, or at another suitable location. Accordingly, the gimbal transceiver 204 moves with the antenna 206 when the wireless information transfer gimbal system 200 orients the antenna 206 in a desired direction.

A wire connection 212 communicatively couples the signal processor 120 to the gimbal transceiver 204. Since the gimbal transceiver 204 moves with the antenna 206, the wire connection 212 does not flex as the wireless information transfer gimbal system 200 moves the antenna 206. Accordingly, there is no risk of device failure due to damage caused by the flexing of the connection 212.

In a radar application, a radar system 210 is configured to receive and process information corresponding to radar signal returns detected by the antenna 206. Accordingly, the stationary transceiver 202 is communicatively coupled to the radar system 210, via a connection 214. Since the stationary transceiver 202 is affixed in a stationary position, the connection 214 does not move or flex, and accordingly, is not subject to potential damage caused by flexure of the connection 214. In an alternative embodiment, the stationary transceiver 202 may reside with or be a component of the radar system 210.

In an exemplary embodiment, the stationary transceiver 202 may be implemented as a receiver and the gimbal transceiver 204 may be implemented as a transmitter. In a radar application, returning radar signals detected by the antenna 206 are encoded into the wireless signal 208 that is transmitted from the gimbal transceiver 204. The wireless signal 208 is received by the stationary transceiver 202. Information corresponding to the returning radar signals is then communicated to the radar system 210.

In another embodiment, the stationary transceiver 202 is operable to generate and communicate the wireless signal 208 to the gimbal transceiver 204. For example, the signal processor 120 may require information and/or instructions for operation. Accordingly, such information and/or instructions are encoded into the wireless signal 208 and communicated from the stationary transceiver 202 to the gimbal transceiver 204. The information and/or instructions are then communicated from the gimbal transceiver 204 to the signal processor 120.

It is appreciated that the stationary transceiver 202 and the gimbal transceiver 204 include components and functionality not described in detail herein. For example, some components of the gimbal transceiver 204 encode information received from the signal processor 120 into digital or analog information suitable for communication using a wireless format. Other components broadcast the wireless signal with the information encoded therein to the stationary transceiver 202. In some embodiments, information received from the stationary transceiver 202 may be received and decoded by components of the gimbal transceiver 204, and then communicated to the signal processor 120 by other components. The various individual components of the stationary transceiver 202 and/or the gimbal transceiver 204 are appreciated by one skilled in the arts, and accordingly, are not described herein for brevity. Further, in some embodiments, the gimbal transceiver 204 may be integrated into the signal processor 120.

In a communications application, the antenna 206 may be configured to transmit a communication signal to a remote device. The wireless information transfer gimbal system 200 is operable to orient the antenna 206 in a direction that facilitates communication of the signal from the antenna 206. In such an embodiment, the stationary transceiver 202 transmits the wireless signal 208, with the communicated information encoded therein, to the gimbal transceiver 204. The gimbal transceiver 204 then communicates the information to a transmitter (not shown) that is broadcasting the communication signal out from the antenna 206.

Since the stationary transceiver 202 and the gimbal transceiver 204 are in communication with each other, the prior art wire connections 122 and/or 124 are no longer required. That is, information communicated over the prior art wire connections 122 and/or is now encoded in and communicated using the wireless signal 208. Accordingly, there is no risk of device failure due to damage caused by the flexing of the prior art wire connections 122 and/or 124.

The exemplary embodiment of the antenna 206 is illustrated as a phased array flat plate radiator type antenna that may be used in a radar system. The antenna 206 may be any type of antenna, such as, but not limited to, a radiometer or a passive antenna. Further, other types of devices may be coupled to the connection members 116, wherein information is communicated from/to the device via wireless signals communicated between the stationary transceiver 202 and the gimbal transceiver 204.

In an exemplary embodiment, the wireless signal 208 is a radio frequency (RF) signal. Accordingly, the stationary transceiver 202 and the gimbal transceiver 204 are RF transceivers (or may be a RF transmitter and/or a RF receiver). In alternative embodiments, the wireless information transfer gimbal system 200 may use any suitable wireless communication medium for the wireless signal 208. For example, the wireless signal 208 may be a wireless signal employing an infrared frequency, a visible light frequency, an ultraviolet frequency, or a microwave frequency. Accordingly, the stationary transceiver 202 and the gimbal transceiver 204 are configured to transmit and/or receive the particular communication media of the wireless signal 208 using a suitable selected frequency.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A radar system comprising:
- a gimbal system with a moveable portion;
- a radar antenna configured to detect return signals and affixed to the moveable portion;
- a gimbal transceiver coupled to the moveable portion and communicatively coupled to the radar antenna; and
- a stationary transceiver,
- wherein the gimbal transceiver is configured to communicate information corresponding to the detected radar return signals to the stationary transceiver using a wireless signal.

2. The radar system of claim 1, wherein the gimbal system points the radar antenna in a desired direction.

3. The radar system of claim 1, wherein the stationary transceiver and the gimbal transceiver are radio frequency (RF) transceivers, and wherein the wireless signal is a RF signal.

4. The radar system of claim 1, wherein the stationary transceiver and the gimbal transceiver are infrared transceivers, and wherein the wireless signal is an infrared signal.

5. The radar system of claim 1, wherein the gimbal system further comprises:
- a stationary base;
- a first rotational member coupled to the stationary base, wherein the first rotational member is configured to rotate the moveable portion about a first axis; and
- a second rotational member coupled to the first rotational member, wherein the second rotational member is configured to rotate the moveable portion about a second axis that is perpendicular to the first axis.

6. A method for communicating radar return signals received at a radar antenna, the method comprising:
- orienting the radar antenna affixed to a moveable portion of a gimbal towards a desired direction;

receiving information corresponding to a radar return at the radar antenna;

communicating the information corresponding to the radar return to a gimbal transceiver affixed to the moveable portion of a gimbal;

communicating a wireless signal with the received information corresponding to the radar return encoded therein, wherein the wireless signal is communicated from the gimbal transceiver; and receiving the wireless signal at a stationary transceiver.

7. The method of claim 6, wherein the wireless signal is a radio frequency signal.

8. The method of claim 6, wherein the wireless signal is an infrared signal.

9. The method of claim 6, further comprising:

communicating a second wireless signal from the stationary transceiver; and receiving the second wireless signal at the gimbal transceiver.

* * * * *